United States Patent
Röhl (10) Patent No.: US 11,958,302 B2
(45) Date of Patent: Apr. 16, 2024

(54) INK PRINTING DEVICE AND METHOD FOR MONITORING A CHAMBER FOR AIRTIGHTNESS

(71) Applicant: Canon Production Printing Holding B.V., Venlo (NL)

(72) Inventor: Stefan Röhl, Munich (DE)

(73) Assignee: Canon Production Printing Holding B.V., Venlo (NL)

( * ) Notice: Subject to any disclaimer, the term of this patent is extended or adjusted under 35 U.S.C. 154(b) by 317 days.

(21) Appl. No.: 17/319,213

(22) Filed: May 13, 2021

(65) Prior Publication Data

US 2021/0354489 A1    Nov. 18, 2021

(30) Foreign Application Priority Data

May 14, 2020    (DE) .......................... 102020113064.3

(51) Int. Cl.
*B41J 29/393*    (2006.01)
*B41J 11/00*     (2006.01)
*G01K 3/14*      (2006.01)
*G01N 25/72*     (2006.01)

(52) U.S. Cl.
CPC ........... *B41J 29/393* (2013.01); *B41J 11/002* (2013.01); *G01K 3/14* (2013.01); *G01N 25/72* (2013.01)

(58) Field of Classification Search
None
See application file for complete search history.

(56) References Cited

U.S. PATENT DOCUMENTS

| | | | |
|---|---|---|---|
| 2012/0285708 A1* | 11/2012 | Bildstein | A62C 3/00 169/46 |
| 2015/0174924 A1* | 6/2015 | Fuchioka | B41J 11/00222 347/102 |
| 2019/0283463 A1 | 9/2019 | Nishimura et al. | |
| 2020/0019102 A1 | 1/2020 | Noguchi | |

FOREIGN PATENT DOCUMENTS

EP    0373932 A2    6/1990

OTHER PUBLICATIONS

German action dated Oct. 20, 2020, Application No. 10 2020 113 064.3.

* cited by examiner

*Primary Examiner* — Erica S Lin
(74) *Attorney, Agent, or Firm* — The Webb Law Firm (57) ABSTRACT

An ink printing device has a dryer chamber that is connected via two openings with the internal space of the printer. To detect whether operational exhaust air flows, as leakage air, from the drying chamber into the internal space, the temperature in the opening region may be measured and compared with a reference value. Given a temperature difference above a threshold value, an error signal is generated and/or corresponding countermeasures are taken in order to reduce the leakage.

12 Claims, 6 Drawing Sheets

INK PRINTING DEVICE AND METHOD FOR MONITORING A CHAMBER FOR AIRTIGHTNESS

CROSS REFERENCE TO RELATED APPLICATIONS

This patent application claims priority to German Patent Application No. 10 2020 113 064.3, filed May 14, 2020, which is incorporated herein by reference in its entirety.

BACKGROUND

Field

The disclosure relates to an ink printing device and to a method for monitoring a chamber for airtightness, wherein the chamber is connected to an additional chamber via at least one opening, and wherein the two chambers exhibit different temperature values in operation.

Related Art

Ink printing devices or ink printing apparatuses may be used for single-color or multicolor printing to a recording medium in the form of a web. The design of such ink printing apparatuses is sufficiently known. In particular, digital high-capacity ink printing apparatuses are known in which inks are ejected with nozzles of a print head onto the moving recording medium. The applied ink is dried in a drying or fixing device so that the ink is permanently bonded with the recording medium, whereby the finished print image is printed on the recording medium.

In inkjet printing, liquid ink is typically printed that typically is comprised of a plurality of components. The main component is often water, to which are added—in addition to colorants—diverse binders and solvents, for example alcoholic or aromatic compounds such as glycol, depending on function. These binders and solvents often have high boiling points in the range of 200° C. to 300° C. After application of the liquid ink onto the recording medium, the ink is typically dried by supplying heat in order to fix the print image on the recording medium.

In operation, upon drying the ink a majority of the water and binders and solvents is evaporated, whereby unwanted substances are also released, for example volatile organic compounds (VOC and VVOC). Particles are released only to a small extent upon drying. However, the emissions of the released substances are well within the legal requirements. Nevertheless, in operation of high-capacity printers, care must be taken that too many pollutants or substances that are health-hazards do not enter into the environment as emissions.

In previous printing systems, an explicit monitoring as to whether emissions from the printing apparatus directly, undesirably arrive in the surroundings of said printing apparatus did not occur. After the initial installation of a printing apparatus, a first setup occurred, after which the possibly escaping mist or vapors should be traced by means of visual inspection in printing operation. However, a drift of the function parameters that are relevant to the airtightness (for example contamination/shift of cross-sections of flow) and physical properties of gases (density changes due to varying temperatures and different installation elevations) are not presently detected.

The setup always takes place "well" within the safe range, in order to generally "protect against" as many disruptions/variations/tolerances as possible. With increasing exhaustion of the machine parameters, the usable safety margins become ever smaller. For the sake of safety, the drying device is more strongly heated, whereby the energy balance and the thermal performance of the printing system degrade. It is conventionally also ensured that more air is drawn from the drying device than is added fresh. A negative pressure is thereby created in the drying device, such that the air in the drying device is essentially only transported away via an air exhaust, if applicable with purification of the exhaust air. Optimally little operational exhaust air should thus arrive in the printer housing or its immediate environment, so that people are not endangered by harmful emissions.

Sensor systems that are already implemented anyway may likewise employ comprehensive tests and calculations in order to make an inference of possibly present leaks. However, with this the actual occurring leaks cannot be detected with certainty.

Also possible as an alternative, additional sensor system are "turbidity sensors", similar to the functional principle of a smoke detector but that, given use in a printing system, are subject to a high degree of contamination due to paper dust and possible operational substances, such as ink vapor. Therefore, these sensor systems would need to be continuously cleaned, for example in high-capacity printers, which would result in a technical cost or would lead to a starkly reduced productivity.

From the disclosure document DE 10 2018 117 699 A1, an ink printing apparatus having an air float drying is known in which a recording medium printed to with ink is dried via hot air. In the dryer housing there, the supply air and exhaust air are controlled so that a slight negative pressure is created in the dryer housing, which should prevent unwanted air leakage of operational exhaust air.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The exemplary embodiments of the present disclosure will be described with reference to the accompanying drawings. Elements, features and components that are identical,

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

The disclosure is based on the problem of achieving an ink printing apparatus and a method for monitoring a chamber for airtightness, via which it is ensured that, in operation, no operational exhaust air arrives, via functionally relevant openings of a chamber whose internal temperature exhibits a significant temperature difference relative to an adjoining chamber, into said adjoining chamber.

An ink printing apparatus according to the disclosure has a first chamber (dryer housing) whose airtightness should be detected. An adjoining chamber (printer housing) has a transport unit for transporting a recording medium in the form of a web; a printing unit having at least one print head for printing to the recording medium; and the dryer housing in which the ink applied onto the recording medium is dried and fixed. The two chambers are connected in terms of air flow via at least one functionally relevant opening. The recording medium is transported through the drying device via the openings.

Arranged inside the dryer housing is at least one heater and/or cooler configured to control the temperature of the dryer, and at least one air supply for supplying tempered air into the dryer housing, as well as at least one air exhaust for discharging air from the dryer housing. A first temperature sensor is arranged outside of the dryer housing, in proximity to an opening of the dryer housing. The temperature sensor measures the (air) temperature at this location. The measured temperature value is sent to an apparatus controller connected (e.g. via a wireless or wired connection) with the temperature sensor, where the measured temperature value is evaluated. The measured temperature value is thereby compared to at least one stored reference value, and an error signal is generated upon exceeding a difference value.

It is thus detected whether air from the warmer internal space of the dryer housing arrives, via the functionally relevant openings of said dryer housing, into the cooler internal space of the printer housing, since the temperature in the region of the opening has changed. It is imperative to avoid this state and, if applicable, to remedy it via countermeasures, since it may thereupon be assumed that health-endangering substances are possibly also arriving into the printer housing.

This achievement has the advantage that it is simple to design, and the manufacturing costs are markedly lower due to only a very few components, such as temperature sensors. A great deal of structural space due to otherwise complicated components is also saved. Via the temperature measurement, it can be rapidly detected whether typically hot solvents diffuse into regions into which they should not arrive.

A method according to the disclosure for monitoring a chamber for airtightness between two chambers at different air temperature values, which two chambers are connected to one another via openings, has the following method steps. Firstly, a temperature value in the chamber to be monitored is measured in proximity to an opening to the second chamber. The measured temperature value is compared with a reference value. An error signal is generated if, upon comparison, a difference value is exceeded that allows a conclusion to be drawn that unwanted air has arrived from the second chamber into the first chamber via openings determined by the system. Due to the error signal, countermeasures may also immediately be taken so that the chamber becomes airtight again.

In one or more exemplary embodiments, the first temperature sensor is a thermocouple that is arranged in the printer housing, in the region of the opening to the dryer housing, so that it measures the air temperature of the leakage air that flows through the opening from the dryer housing. This has the advantage that an unwanted air flow may be detected rapidly, since in operation the two internal spaces of printer housing and dryer housing are at markedly different temperatures, since markedly higher temperatures prevail in the dryer housing as a result of the hot air drying.

In addition, a second temperature sensor may be arranged inside the dryer housing, and a third temperature sensor may be arranged inside the printer housing. These temperature sensors measure temperature values that may be used as reference values. The temperature difference of the two internal spaces, and at which temperature levels the two internal spaces are, may thus be simply verified. Where the leakage air is coming from may thus be detected based on the level of the measured temperature, and how strong the leakage air flow is may be determined based on a temperature difference relative to a reference value. The temperature difference or also the temperature gradient of the curve of the temperature of the flowing leakage air may thus allow a rapid inference about the flow of operational exhaust air from the dryer housing.

If the opening has a tunnel-shaped collar, two temperature sensors may be arranged in the region of the collar, approximately one after one another in the flow direction with a predetermined clearance from one another, thus in the flow path of leakage air. The direction of a leakage air flow may thereby be detected, as well as the strength of the leakage air flow.

It is advantageous if only one temperature sensor is arranged in proximity to one of a plurality of openings of the dryer housing in order to detect the temperature variation of the air flowing between the internal space of dryer housing and printer housing. The opening is advantageously selected through which the most leakage air may flow, and at which it is most probably that leakage air flows in an unwanted direction. Only [a] single temperature sensor is thereby required if its measurement values also supply the reference value (previously measured temperature values).

For the sake of certainty, a respective temperature sensor may also be arranged in proximity to each opening of the dryer housing in order to detect the temperature variation of the air flowing between the internal spaces of dryer housing and printer housing. All unwanted air flows through all openings are thus detected and may be assessed accordingly.

Figure 1:
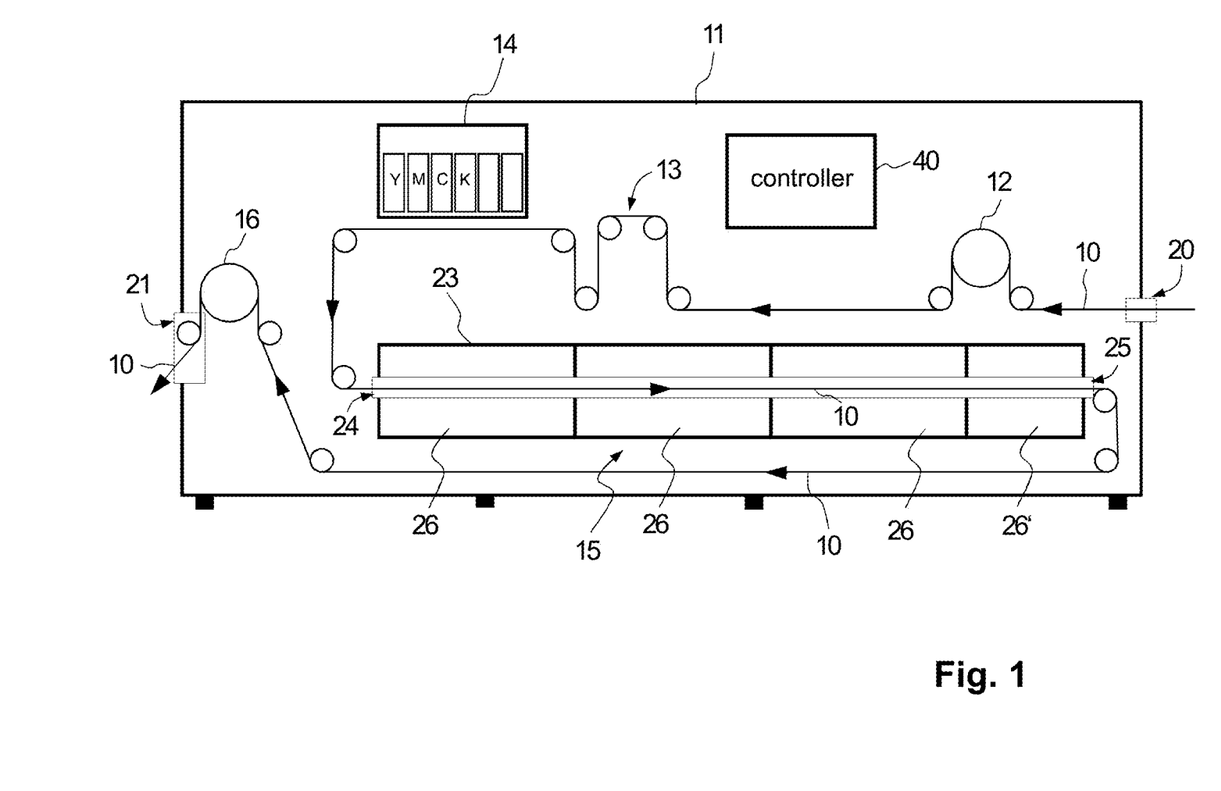
FIG. 1 illustrates an ink printing apparatus, configured to print to a recording medium in the form of a web, according to an exemplary embodiment.

Depicted in FIG. 1 is an in particular for printing to a recording medium 10 in the form of a web. The ink printing apparatus has a chamber (here it is referred to as a printer housing 11) through which the recording medium 10 to be printed to is transported. The recording medium 10 is drawn into the ink printing apparatus in the transport direction (see arrows in the recording medium 10) via an intake 12. The lateral alignment of the recording medium 10 upon transport through the ink printing apparatus is regulated via a rotating frame 13. The recording medium 10 is printed to on one side by a printing unit (printer) 14 having a plurality of ink print heads. In an adjoining drying device 15 or fixing unit (fixer), the ink—and therewith the print image—is dried and thus fixed on the recording medium 10. The recording medium 10 is guided out of the ink printing apparatus via a takeoff 16. The recording medium 10 may thereby be turned by a turner (not shown) so that the back side may be printed to in a further ink printing apparatus. The recording medium 10 that has been printed to may also be supplied as needed to a post-processor (not shown) where it is further processed, for example is cut to size (e.g. using a cutter).

For a multicolor printing, a plurality of print bars having at least one print head are arranged in the printing unit 14, wherein each print bar may print a different color or fluid. The printing unit 14 with six print bars (four of these for the primary colors YMCK) is depicted in FIG. 1.

The printer housing 11 has an opening as an intake slit 20 through which the recording medium 10 is drawn into the ink printing apparatus. Furthermore, an opening is provided as a takeoff slit 21 from which the recording medium 10 is transported out of the ink printing apparatus.

In the region of the openings, air nozzles (what are known as air knives) or rollers may also be arranged that should reduce leakage. Given rapidly transported recording medium 10 into and out of the openings, the air flow of a laminar boundary layer may therewith also be reduced.

The drying device 15 has a dryer housing 23 that likewise has openings, for example an inlet slit 24 and an outlet slit 25. These are only as large as necessary so that the recording medium 10 is also not damaged at said inlet slit 24 or outlet slit 25, and so that too much air does not flow across these openings as unwanted leakage. The dryer housing 23 may be subdivided into a plurality of sub-chambers 26, 26' in which the recording medium 10 may be charged with heat to dry the ink and, later (the last sub-chamber 26' to the right in FIG. 1), with cold to cool down the recording medium 10. The sub-chambers 26, 26' are likewise provided with openings/slits for the transport of the recording medium 10.

Here the drying device 15 is designed as what is known as an air float dryer, in which hot air is blown onto the recording medium 10 from both sides via air nozzles in order to dry the ink. The last sub-chamber 26' in the transport direction may, for example, have a cooling via which the recording medium 10 is cooled down by means of air nozzles so that the print image can no longer be damaged upon further transport, even given contact with transport rollers. In the operation of the ink printing apparatus, a markedly lower temperature (for example 25-35° C.) thus prevails in the internal space of the printer housing 11 than in the heated dryer housing 23 (for example 100-200° C.). The sub-chamber 26' forms a possible exception if this is designed as a cooling space within the dryer housing 23, [at] which a temperature similar to or slightly higher than that in the printer housing 11 then prevails.

Heated or cooled air (referred to in the following as supply air) is supplied to the air nozzles via an air supply 27, and humid and warm air (referred to in the following as exhaust air or operational exhaust air) is discharged to the atmosphere via an air exhaust 28 and an exhaust air conduit (not shown in detail), as is depicted in the following FIGS. 2 through 5.

Figure 2:
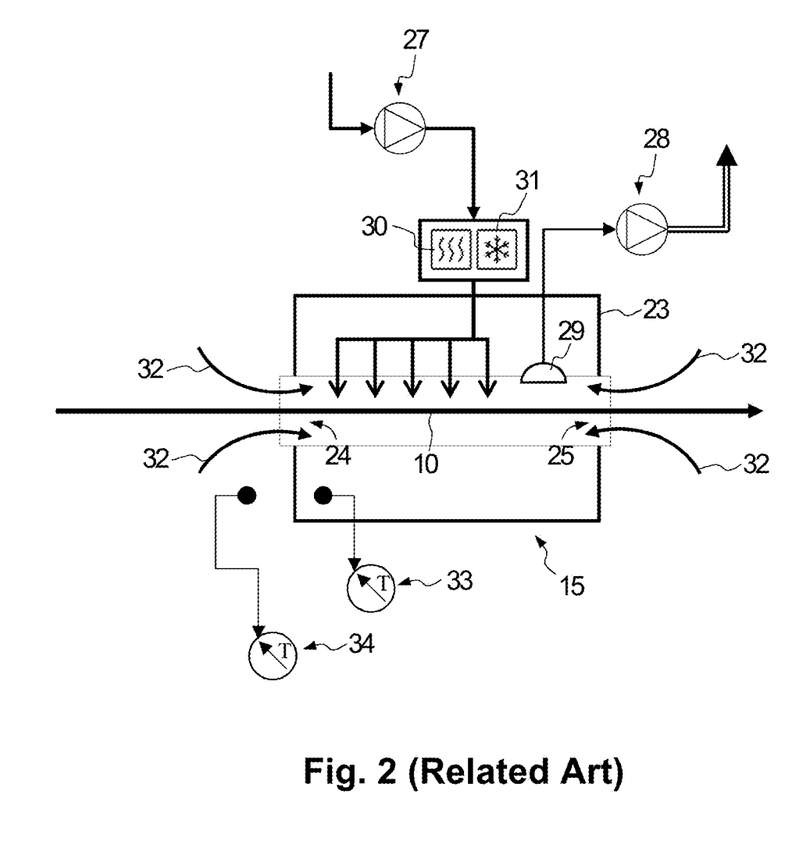
FIG. 2 illustrates an example ink printing apparatus with the control of supply air and exhaust air of a dryer housing.

Depicted in FIG. 2 is a section from a block diagram of a known ink printing apparatus of the prior art, in which the airtightness of a dryer housing 23 is regulated via the quantities of supply air (air supply) and exhaust air (air discharge) at an air supply 27 or air exhaust 28.

An ink printing apparatus conventionally has a drying device 15 whose outer walls form a largely sealed chamber (i.e. a dryer housing 23). A heating 30 via which heat is generated to dry the ink, and a cooling 31 via which cold is generated to cool the recording medium 10, supply tempered air into the dryer housing 23.

Here, an air float drying is depicted given which heated air is blown by air nozzles onto the recording medium 10. Such air float dryers are already known, for example from DE 10 2018 117 699 A1 (=US 2020/023634 A1), whose disclosure content is herewith explicitly adopted into the present disclosure.

Fresh air must be continuously supplied to such a drying device 15, which fresh air may beforehand be heated with the aid of the heating 30 or cooled by means of cooling 31 in order to obtain tempered supply air. A large amount of water vapor and other vapors, for example of binders and solvents contained in the ink, is created upon drying the ink. These vapors must be discharged into the environment so that a possible impermissible concentration of the operational air in the dryer housing 23 may be counteracted and the print images may be more effectively dried. The operational air must often be purified before it is discharged into the environment (the exhaust air purification is not depicted here).

Given such a drying device 15, it is imperative to avoid that the operational exhaust air created in the printing operation arrives from the dryer housing 23 into the printer housing 11, and from there into the environment of the ink printer; rather, it is only to be discharged to the environment via the air exhaust 28 provided for this, often with after-treatment via purification and filter devices. Since the dryer housing 23 has at least one inlet slit 24 and one outlet slit 25 for the recording medium 10, operational exhaust air may arrive via the openings from the dryer housing 23 into the printer housing 11 as leakage air 32 (symbolized by the curved arrows in FIGS. 2 through 5). In order to prevent this, it is typically provided, and provided in known ink printing apparatuses, that somewhat more (operational) exhaust air is always drawn from the dryer housing 23 via a suction 29 than arrives therein via supply air. A slight negative pressure is thus created in the dryer housing 23, which results in a slight air flow (leakage air 32) from the printer housing 11 into the dryer housing 23 via the inlet slit 24 and the outlet slit 25, thus via the openings. As long as leakage air 32 flows into the dryer housing 23, it is assumed that the dryer housing 23 is airtight. By contrast, if operational exhaust air unexpectedly arrives as leakage air 32 from the dryer housing 23 into the printer housing 11, the dryer housing 23 is defined as leaky. The supply air and the exhaust air are therefore adjusted approximately so that more exhaust air is always discharged into the environment than supply air is supplied. A desired negative pressure in the dryer housing 23 is thereby created via which leakage air 32 is drawn from the printer housing 11 into the dryer housing 23. The difference between supply air and exhaust air is thereby estimated in advance according to empirical evaluation, so that the dryer housing 23 is always "airtight" as delivered, and in that the negative pressure is adjusted via the empirical data so that machine tolerances, leaks, aging processes (for example variations in the transport capacity of ventilators for supply air and exhaust air and temperature fluctuations) as well as density variation of the air are compensated.

The negative pressure in the dryer housing 23 is typically measured and monitored during operation. The negative pressure in the dryer housing 23 is likewise adjusted on site, and reviewed and possibly readjusted at regular intervals. Among other things, this serves to adjust the altitude at which the apparatus is located.

Given such a known ink printing apparatus, optionally the temperature in the dryer housing 23 may be measured by a temperature sensor (this is referred to as internal sensor 33 in the following) and by a temperature sensor in the printer housing 11 (this is referred to as external sensor 34 in the following, and the air in the printer housing 11 is referred to as external air). These temperature sensors are arranged at a distance from the housing walls, and far enough distant from openings so that they may measure the mean temperature in the respective housing without being influenced and with certainty.

However, variations that are individual to the machine that may lead to a positive pressure in the dryer housing 23 are not detected in spite of temperature measurements, such that the dryer housing 23 would then be "not airtight" since operational exhaust air might then flow as leakage air 32 into the printer housing 11.

Figure 3:
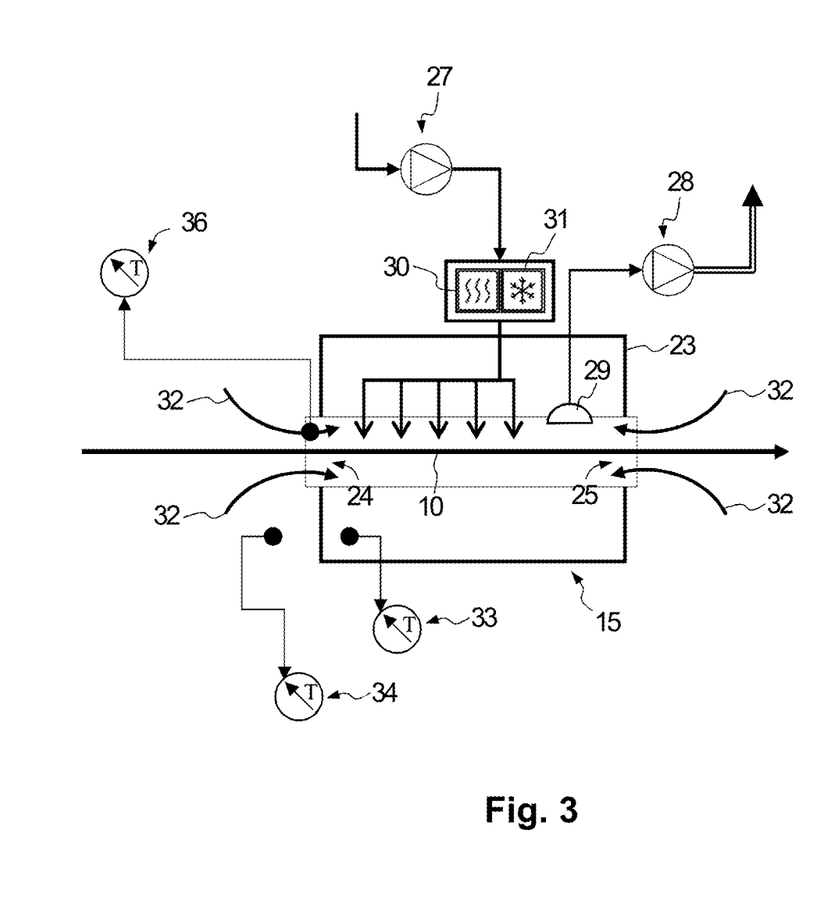
FIG. 3 illustrates an ink printing apparatus, according to an exemplary embodiment, configured to monitor a dryer housing for airtightness given an airtight dryer housing.

A portion of an ink printing apparatus according to the disclosure for monitoring a chamber (here dryer housing 23) for airtightness is depicted in FIG. 3. After activation of the ink printing apparatus, the internal temperature and the external temperature are approximately the same. Upon heating of the drying device (or before beginning the drying), the internal temperature in the dryer housing 23 increases to the operating temperature of approximately 100° C. to 200° C. The exhaust air now must be set to be greater than the supply air, whereby the leakage air 32 corresponding to the pressure difference flows into the dryer housing 23. The dryer housing 23 is thus airtight, since the operational exhaust air is drawn off via the air exhaust 28.

In order to detect the airtightness in the further operation, at least one temperature sensor (this temperature sensor is referred to in the following as a leakage air sensor 36) is arranged in the flow region of possible leakage air 32 through at least one functionally relevant opening of the dryer housing 23. In FIG. 3, the leakage air sensor 36 is arranged in proximity to the inlet slit 24 to the dryer housing 23 so that possible leakage air 32 that flows through the inflow region flows around said leakage air sensor 36 (independent of the flow direction of the leakage air 32). The leakage air sensor 36 is thereby arranged outside of the dryer housing 23.

The leakage air sensor 36 measures the air temperature of the leakage air 32 flowing past it. Under normal circumstances, the leakage air 32 flows inward due to the negative pressure, whereby the measured temperature corresponds approximately to that in the printer housing 11. Due to unexpected temperature operations, or any sort of disruptions or defects, it may occur that the negative pressure disappears and leakage air 32 thereby begins to flow outward. Hot operational exhaust air therewith moves outward and flows past the leakage air sensor 36. This now measures a higher temperature value. The measured value of the air temperature is compared with a reference value. If the temperature difference between the two exceeds a predetermined or set threshold, an error signal is generated, since it is to be assumed that too much operational exhaust air is flowing outward.

During operation, the temperature of the air in the dryer housing 23 is largely known and is typically in a range from 100° C. to approximately 220° C., depending on the drying method. This temperature may also optionally be measured with an internal sensor 33. The temperature of the air in the printer housing 11 is typically in a range between 20° C. and 35° C., depending on the ambient temperature and heat insulation of the dryer housing 23. This temperature may optionally be measured with an external sensor 34.

The temperature of the leakage air 32 is measured by the leakage air sensor 36 in the immediate surroundings, at the outside, and in the flow region of the functionally relevant opening (here the inlet slit 24); it may thus be verified whether the dryer housing 23 is airtight and the leakage air 32 continues to flow from the outside inward.

The value of the external temperature that is measured by the external sensor 34 may be used as a reference value. A previously measured temperature value of the leakage air sensor 36 may also be used as a reference value. In addition to this, temperature values previously measured by the leakage air sensor 36 may be used as a reference value.

The temperature difference may still be within a predetermined tolerance threshold, whereby it may be assumed that no leakage air 32 or only a very slight amount of leakage air 32 is arriving from the dryer housing 23 into the printer housing 11, or that leakage air 32 has just flowed into the dryer housing 23. In this state, the dryer housing 23 is still assumed to be airtight.

Figure 4:
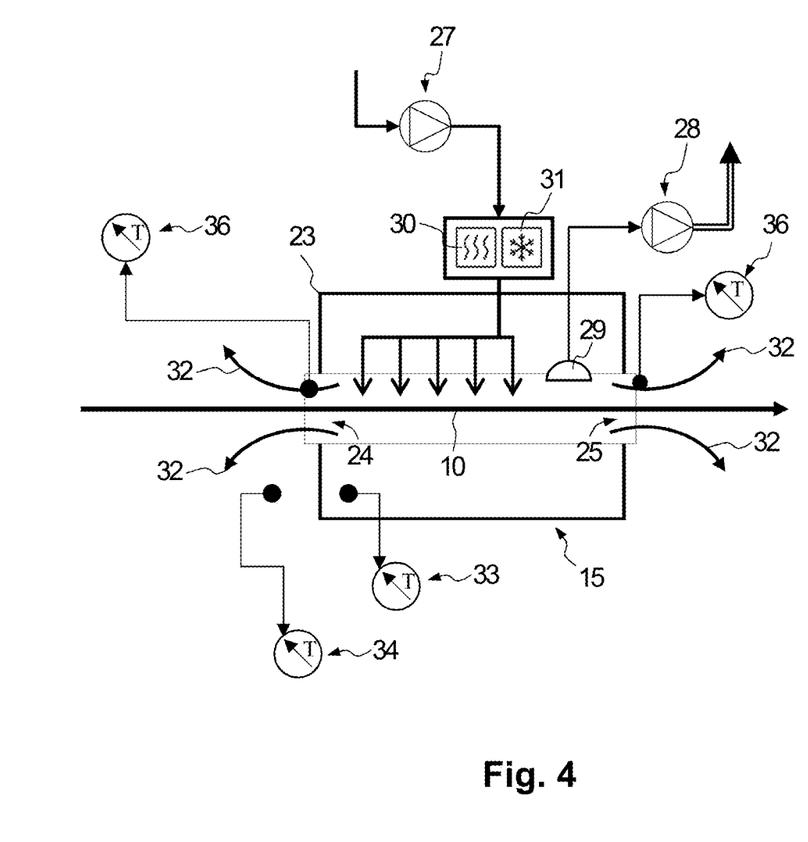
FIG. 4 illustrates an ink printing apparatus, according to an exemplary embodiment, configured to monitor a dryer housing for airtightness given a dryer housing that is not airtight.

After the printing operation has ramped up, in the printing operation the temperature of the leakage air 32 is continuously monitored and compared with a reference value. If hot operational exhaust air now flows outward as leakage air 32 (as is depicted in FIG. 4), the leakage air sensor 36 measures a higher temperature than before. If the temperature difference between measured temperature and reference value is too great (threshold is exceeded, this is detected immediately). A non-airtight dryer housing 23 is then assumed, and a warning should be output and countermeasures should be introduced.

The external temperature that prevails in the printer housing 11, which is directly measured on the one hand or stored as a previous measurement value, is used as a starting value for the reference value. In the course of the operation, the reference value may originate from the external sensor 34 or from temperature values previously measured by the leakage air sensor 36 and be adapted accordingly. A plurality of measurement values recorded in chronological succession may also be used and be compared with one another. All temperature sensors (including leakage air sensor 36) are connected to an apparatus controller 40 in which the evaluation of the measurement values and the calculation and storage of reference values are performed.

If the internal temperature and the external temperature are known, the quantity of leakage air 32 may be concluded from the temperature difference of measured temperature of the leakage air 32 and external temperature, or from the rise in temperature. As soon as it is detected that the dryer housing 23 is not airtight and leakage air 32 is flowing outward, the apparatus controller 40 generates an alarm or engages countermeasures so that no operational exhaust air, here leakage air 32, with possibly health-endangering substances, vapors, or gases, arrives into the printer housing 11 and flows outward. In an exemplary embodiment, the controller 40 includes processing circuitry that is configured to perform one or more functions and/or operations of the controller 40.

A temperature gradient of how quickly the measured temperature values of the leakage air 32 change may also be determined. If the gradient exceeds a threshold, it may thus no longer be assumed that the dryer housing 23 is airtight, since the status changes quite rapidly and countermeasures must be taken rapidly.

For example, a commercially available thermocouple that is arranged in the flow region of the leakage air 32 may be used as a temperature sensor (leakage air sensor 36). The greater the temperature difference between internal temperature of the air of the dryer housing 23 and the external temperature of the air of the printer housing 11, the more strongly that this affects the air temperature of the leakage air 32 if hot operational exhaust air flows outward in the leakage air 32. A decrease or increase of the air temperature also occurs in the flow direction of the leakage air 32 as soon as warmer or cooler air masses intermix.

A thermocouple has the advantage that temperature differences arising due to outflowing hot gases can be detected very quickly. As soon as large temperature differences are measured in comparison to a reference value, an error signal may be generated as a reaction thereto, via which a warning may be triggered or other productive safety circuits may be activated that may counteract the "lack of airtightness". A fast control loop may therefore likewise be constructed that always provides for a predetermined negative pressure in the internal space of the dryer housing 23 via suitable control of the supply air, the exhaust air, and/or the internal temperature, and thus prevents the escape of operational exhaust air into the external space of the printer housing 11. In the event that countermeasures are no longer sufficient to keep the dryer housing 23 airtight, the printing operation should be stopped and service should be called.

In FIG. 4, the situation is depicted that operational exhaust air arrives from the dryer housing 23 into the printer housing 11 (thus outward) via the openings (inlet and outlet slits 24, 25). The dryer housing 23 is then not airtight.

In operation, the internal temperature is markedly higher than the external temperature. If hot operational exhaust air now flows outward as leakage air 32 across the leakage air sensor 36, the measured air temperature increases. A temperature difference is thus created relative to previously measured temperature values or to stored reference values. The dynamics of the temperature rise may even be detected depending on the rise (gradient) or level of the temperature difference relative to the most recently measured temperature value within a predetermined time period or relative to a different reference value.

Figure 5:
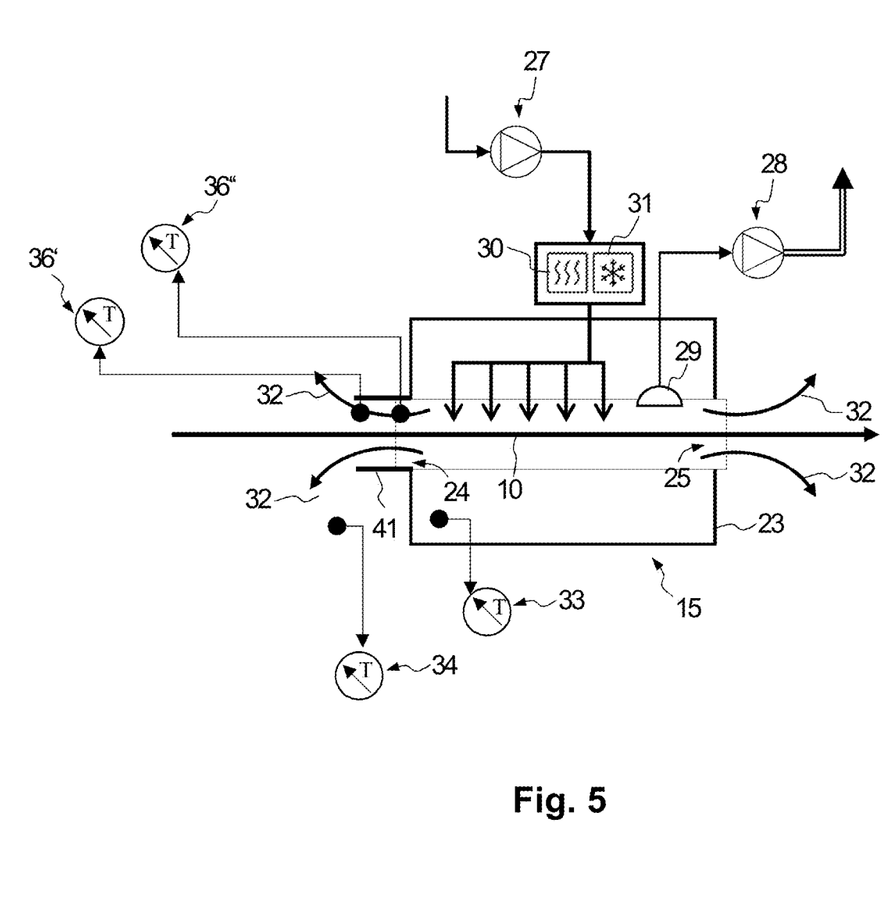
FIG. 5 illustrates an ink printing apparatus, according to an exemplary embodiment, configured to monitor a dryer housing for airtightness given a dryer housing that is not airtight.

An additional exemplary embodiment in order to detect the airtightness of the dryer housing 23 is depicted in FIG. 5. An opening (here the inlet slit 24) hereby has a tunnel-shaped collar 41. The collar 41 protrudes outward from the dryer housing 23 with a predetermined length. The recording medium 10 is transported through this tunnel-shaped opening. In the region of the opening, an external and an internal leakage air sensor 36', 36" are arranged along the collar 41 at a predetermined clearance from one another in the transport direction. In the normal state, without leakage air 32 or an inward leakage air 32, the outer leakage air sensor 36' measures approximately the external temperature and the inner leakage air sensor 36" measures a somewhat higher temperature, due to the proximity of the markedly warmer air in the dryer housing 23.

If the temperature values measured by the internal leakage air sensor 36" and the external leakage air sensor 36' are at approximately the same level, it may be assumed that the leakage air flow travels inward or that only a very slight leakage air flow is present. The dryer housing 23 is detected as being airtight. No further measures need to be undertaken.

By contrast, if hot leakage air 32 flows outward into the printer housing 11, hot operational exhaust air then first flows past the internal leakage air sensor 36" and only then past the external leakage air sensor 36'. The air temperature thus increases first at the internal leakage air sensor 36" and then, somewhat later chronologically, at the external leakage air sensor 36. As soon as the determined temperature difference rises significantly within a brief period of time, the internal space begins to be not airtight. An error signal is generated, whereby countermeasures may then be taken, for example increasing the quantity of exhaust air and/or reducing the quantity of supply air and/or controlling the temperature of the dryer housing 32.

These countermeasures may continue until the internal space is airtight again, when the measured temperature value conforms again to the reference value or the measured temperature value approaches the external temperature again.

With two leakage air sensors 36' and 36" arranged one after another, the direction of the temperature variation may be detected. A gradient of the temperature change may also be detected, meaning that how rapidly and in which direction the air temperature of the leakage air changes within a time period may be detected.

In an exemplary embodiment, only a single leakage air sensor 36 is present at a single opening (e.g. inlet slit 24). In particular, the largest opening of the dryer housing 23 is selected, since presumably the most leakage air 32 might flow across this. There a temperature change is then also detected earliest, and thus the lack of airtightness may be reacted to rapidly with corresponding countermeasures.

The air temperature outside of the dryer housing 23 is thereby measured at a single location. It is then assumed that largely the same conditions prevail at all other openings. Only if a hot air flow (flowing warmer leakage air 32 from the dryer housing 23) is present do the temperature values measured by the leakage air sensors 36, 36', 36" also change.

At least one leakage air sensor 36 may also respectively be arranged in proximity to a plurality of or every opening of the dryer housing 23 in order to detect the temperature variation of the air flowing between the internal spaces of dryer housing 23 and printer housing 11 (as is depicted in FIG. 4 with the second leakage air sensor 36 in proximity to the output slit 25). All measured temperature values are evaluated individually by the apparatus controller 40 for each opening and assessed accordingly as to whether the dryer housing 23 is airtight or not airtight.

As a countermeasure, after triggering an error signal the apparatus controller 40 may control the exhaust air quantity and/or the supply air quantity and/or the internal temperature in order to reduce the unwanted outgoing leakage air 32 and reverse the flow, so that it flows into the dryer housing 23 again. This airtight state is detected using temperature values that are newly measured with the leakage air sensors 36, 36', 36".

Due to the error signal, an optical or acoustic alarm may also be triggered in order to warn people in the vicinity or call for service personnel so that the cause of the error may be remedied.

Figure 6:
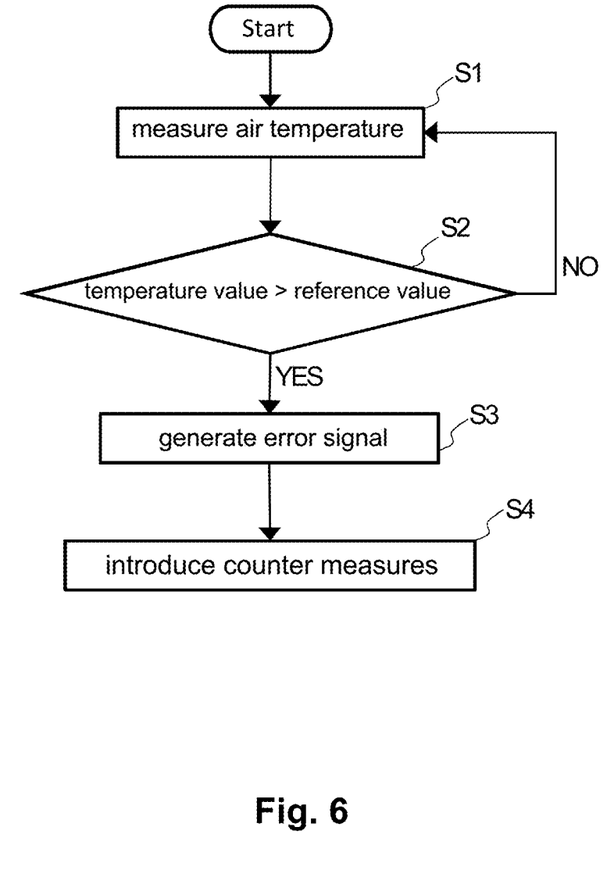
FIG. 6 is a flowchart of a method for monitoring a chamber for airtightness according to an exemplary embodiment.

A workflow diagram for a method for monitoring a chamber for airtightness is depicted in FIG. 6. It is assumed that, in general, two chambers are present (the dryer housing 23 and the printer housing 11 in the instance of an ink printing apparatus) that are connected with one another via at least one opening determined by the system. The internal spaces of the two chambers 11, 23 exhibit markedly different air temperatures. It should now be detected whether one of the chambers 11, 23 is airtight or not airtight. When it is established that a chamber is not airtight, corresponding countermeasures should be taken so that the chamber becomes airtight again.

According to the disclosure, this is brought about in step S1 via an air temperature measurement of the leakage air 32 in the region of an opening in the event that the two chambers 11, 23 exhibit markedly different chamber temperatures. The leakage air 32 may flow from one chamber to the other via the openings. At least one temperature value is hereby measured with the temperature sensor (leakage air sensor 36, 36', 36"). In step S2, the measured temperature value is subsequently compared with a reference value. As long as the measured temperature value is less than the reference value, the air temperature is measured again after a brief pause and compared with a reference value.

By contrast, if a temperature value is greater than a threshold, an error signal is generated in step S3. The error signal indicates an undesirably high leakage air flow. Subsequently, in step S4 the chambers may optionally be brought into equilibrium again by controlling supply air quantities and/or exhaust air quantities into or out of the respective chambers, and/or by controlling the temperature of the chambers, so that the newly measured temperature value is again less than the threshold. The chamber is then airtight again. This is verified via temperature measurements by the temperature sensor. A lack of airtightness may thus be corrected so that the internal chamber (here 23) is airtight again.

A leak or a leakage is a hole, an opening, or a lack of airtightness in a housing via which gases (leakage air 32) may undesirably enter or exit. A leakage may lead to malfunctions or health hazards in the event that it is not detected and corrected as rapidly as possible.

Given an ink printing apparatus, the leak exists in system-dependent slits 20, 21, 24, 25 through which a recording medium 10 is transported. These openings are functionally required, but should be kept as small as possible so that, generally, not too much leakage air 32 may flow through said openings. The openings also need to be large enough so that the recording medium 10 is safely undamaged upon transport (meaning that the openings are designed with safety clearance around the region of the recording medium 10).

Temperature sensors are electrical or electronic components that supply an electrical signal as a measure of the temperature. One example of a temperature sensor is a thermocouple that is comprised of a pair of metallic conductors made of different material that are connected at one end and are suitable for temperature measurement due to the thermoelectric effect. Thermocouples can measure the air temperature very well and rapidly. In FIGS. 2-5, the locations of the temperature sensors are represented by thick dots that are connected via conductors with the respective measurement electronics (with the symbol T for temperature).

Other suitable temperature sensors, such as a thermal air mass sensor, may of course also be used. These would have the advantage that, aside from the temperature of the leakage air 32, the humidity and the mass flow of the leakage air 32 (molar mass per time period) could be measured and evaluated.

The temperature sensors are arranged in proximity to the openings so that they may measure the temperature of the leakage air 32 that flows through the opening. The leakage air sensor 36 is thereby arranged in the region of and in proximity to the opening, but outside of the chamber to be monitored. A precondition for this is that a large temperature difference prevails between internal temperature and external temperature so that correspondingly certain conclusions about the airtightness of chambers may be drawn via temperature measurement of the leakage air 32 and comparison with a reference value.

If the spatial flow conditions of the leakage air 32 are known, the location of the leakage air sensors 36, 36', 36" may be precisely chosen in order to measure the temperature in the region of the strongest leakage air flow. Typically, this is that opening that permits the greatest air leakage, and there in a middle region between the edges of the slits 24, 25 and the recording medium 10 (thus also not within the influence of the laminar boundary air flow that is always present at the surface of a rapidly transported recording medium 10).

Given an ink printing apparatus, the inlet slit 24 is the best location for the leakage air sensor 36 because there the temperature difference between internal temperature and external temperature is greatest. Given an airtight dryer housing 23, an external temperature of approximately 30° C. (±5° C.) prevails in the region of the leakage air sensor 36, and an internal temperature of 100° C. to 200° C. prevails in the adjoining dryer housing 23.

The outlet slit 25 is less suitable as a location for the leakage air sensor 36. At the outlet side of the dryer housing 23, the recording medium 10 is cooled in the space directly before the outlet slit 25. In this space, a temperature (approximately 30° C. to 60° C.) close to the external temperature prevails. The temperature difference between internal temperature and external temperature is thus very slight. Therefore, it is more difficult to make an inference regarding airtightness from only the measured temperature of the leakage air 32. It also makes less sense to detect the leakage air 32 there, since only small amounts of vaporous solvents are present in this space due to the cooler temperatures.

Supply air is supplied from the outside to the internal space of the dryer housing 23, and operational exhaust air that is "consumed", loaded, or contains a great deal of water vapor is discharged. The quantities of supply air and exhaust air may be controlled or regulated via the air supply 27 and the air exhaust 28, for example depending on the temperature measured with the leakage air sensor 36 in comparison to a reference value, thus depending on whether the internal space is airtight or not airtight.

The associated supply air and air exhausts 27, 28 may be equipped with a thermal recovery to save energy. In addition to this, the supply air and air exhausts 27, 28 may be equipped with diverse air filter elements and an exhaust gas purification so that the emissions of pollutants remain below legal requirements. The operational exhaust air, filtered and purified, may thus be discharged into the environment via chimneys or other exhaust air conduits.

Given an ink printing apparatus, the term "external" refers to the printer housing 11. The external temperature is thus the air temperature in the printer housing 11. If leakage air 32 flows outward, it arrives in the space effectively enclosed by the printer housing 11 (thus corresponds to the internal space of the printer housing 11 without the internal space of the dryer housing 23). The external leakage air sensor 36' is thus arranged closer to the internal space of the printer housing 11 than the internal leakage air sensor 36".

The term "internal" relates to the dryer housing 23. The internal temperature is thus the air temperature in the dryer housing 23. If leakage air 32 flows inward, it arrives in the space effectively enclosed by the dryer housing 23 (this corresponds to the internal space of the dryer housing 23). The internal leakage air sensor 36" is arranged closer to the internal space of the dryer housing 23 than the external leakage air sensor 36'.

The term "operational exhaust air" refers to the air in the internal space of the dryer housing 23. The operational exhaust air contains the substances vaporized upon drying the print image, such as water vapor and, if applicable, solvents, all substances that are necessarily contained in the ink.

Volatile organic compounds (abbreviated as VOCs) may thus also be contained in some inks as necessary constituents. It is undesirable if such VOCs enter in larger quantities into regions in which people are present, since they may in part be health hazards.

The term "airtight" means that no leakage air 32 (with operational exhaust air), or only a small quantity of leakage air 32, flows outward through the openings. In operation, given an airtight dryer housing 23, a small quantity of leakage air 32 flows inward into the dryer housing 23. By contrast, as soon as a significant quantity of leakage air 32 flows outward through the opening, it is said that the dryer housing 23 is "not airtight". No (or only very little) operational exhaust air should arrive into the printer housing 11.

In the disclosure, measured air temperatures and temperature differences are applied in order to detect the airtightness of a chamber. The air density changes are not considered, but might also be taken into account given suitable sensor systems.

The measured temperature value is compared with at least one reference value. One or more previously measured temperature values may serve as a reference value. A plurality of previously measured temperature values may thereby also be treated with mathematical methods, for example an averaging, so that singular measurement errors/outliers remain unconsidered. The values of the external temperature in the printer housing 11 and/or of the internal temperature may likewise serve as reference values.

The change over time of the temperature values and/or the gradient (rise/fall of the temperature) may also be taken into account in the evaluation of the temperature difference. An entire measurement series, comprised of a plurality of measurement values, may also be continuously evaluated. For example, the temperature may be measured every second. However, the detection of the lack of airtightness makes sense only during the printing operation. It is predominantly only during printing operation (upon drying the print images) that possible unwanted and, under the circumstances, health-endangering solvents and substances are evaporated. After longer downtimes of the ink printing apparatus, the temperatures within the apparatus are largely the same and leakage air plays only a subordinate role.

The method functions even if the internal chamber is a cooling chamber and the external chamber (surrounding space) is significantly warmer. For example, given a cooling chamber this method might be used in order to monitor whether too much warm air arrives into the cooling chamber upon introduction of goods to be cooled via an opening (lock or gate). A leakage air sensor 36 that measures the temperature of the leakage air 32 might then be arranged in the cooling chamber, in proximity to the opening. Whether the cooling chamber is airtight or not may then be detected from the established temperature difference. The cooling chamber should not warm unnecessarily. Given a detected lack of airtightness, countermeasures may be taken, such as lowering the temperature in the cooling chamber or achieving a slight overpressure via supply air so that less leakage air 32 enters from the outside when the lock is open.

The disclosure was explained in detail using an ink printing apparatus. The disclosure may, of course, also be used given other printing apparatuses in which dry toner or liquid toner is printed and the print image is dried via heat in a dryer housing.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

For the purposes of this discussion, the term "processing circuitry" shall be understood to be circuit(s) or processor(s), or a combination thereof. A circuit includes an analog circuit, a digital circuit, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein. In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST 10 recording medium
11 printer housing
12 intake
13 rotating frame
14 printing unit (printer)
15 drying device
16 takeoff
20 intake slit
21 takeoff slit
23 dryer housing
24 inlet slit
25 outlet slit
26, 26' sub-chamber of the dryer housing
27 air supply
28 air exhaust
29 suction
30 heating
31 cooling
32 leakage air
33 internal sensor
34 external sensor
36 leakage air sensor
36' external leakage air sensor
36" internal leakage air sensor
40 apparatus controller
41 collar
S1, S2, S3, S4 method step

The invention claimed is:

1. An ink printing device comprising:
   a printer housing in which is arranged a transport configured to transport a recording medium in the form of a web;
   a printer having configured to print to the recording medium;
   a dryer configured to dry and fix ink applied onto the recording medium, the dryer including:
      a dryer housing with two openings comprising an inlet slit and an outlet slit via which the recording medium is transported through the dryer,
      at least one heater and/or cooler configured to control a temperature of the dryer,
      at least one air supply configured to supply tempered air into the dryer housing, and
      at least one air exhaust configured to discharge operational exhaust air from the dryer housing;
   at least one temperature sensor arranged at a location outside of the dryer housing, in proximity to the at least one of the two openings of the dryer housing, the at least one temperature sensor being configured to measure a temperature at the location; and
   a controller communicatively coupled to the at least one temperature sensor and configured to: evaluate measured temperature values, compare a measured temperature value with at least one reference value, and generate an error signal based on the comparison,
   wherein at least one of the two openings has a tunnel-shaped collar, in the region of which the at least one temperature sensor is arranged,
   wherein the at least one temperature sensor comprises a first temperature sensor and a second temperature sensor arranged one after another in a flow direction with a predetermined clearance, and
   wherein the flow direction is a flow direction of a leakage air which is either created when a negative pressure is created in the dryer housing which results in an air flow from the printer housing into the dryer housing via the two openings or when operational exhaust air arrives as leakage air from the dryer housing into the printer housing via the two openings.

2. The ink printing device according to claim 1, wherein the controller is configured to generate the error signal in response to the measured temperature value exceeding the at least one reference value.

3. The ink printing device according to claim 1, wherein the at least one temperature sensor is a thermocouple that is configured to measure an air temperature flowable through the two openings from the dryer housing.

4. The ink printing device according to claim 1, further comprising:
   a third temperature sensor arranged inside the dryer housing at an internal location, the third temperature sensor being configured to measure an internal temperature at the internal location; and
   a fourth temperature sensor arranged at an external location inside the printer housing and outside of the dryer housing, the fourth temperature sensor being configured to measure an external temperature at the external location.

5. The ink printing device according to claim 1, wherein the at least one temperature sensor is configured to detect temperature variation of air flowing between internal spaces of dryer housing and printer housing.

6. The ink printing device according to claim 1, wherein the at least one temperature sensor and another temperature sensor being respectively arranged in proximity to each of the two openings of the dryer housing to detect a temperature variation of air flowable between internal spaces of dryer housing and printer housing.

7. A method for monitoring a dryer housing of the ink printing device according to claim 1 for airtightness between the dryer housing and the printer housing at different internal temperatures, the method comprising:
   measuring, using the first temperature sensor and the second temperature sensor, a temperature value in the dryer housing, in proximity to one of the two openings to the printer housing;
   comparing, by the controller, the measured temperature value with the at least one reference value, and
   generating, by the controller, the error signal based on the comparison.

8. The method according to claim 7, wherein the error signal is generated in response to a temperature difference between the measured temperature value and the reference value exceeding a threshold value.

9. The method according to claim 7, wherein one or more temperature measurement values that are measured in an internal space of the dryer housing and/or in an internal space of the printer housing are used as the reference value.

10. A non-transitory computer-readable storage medium with an executable program stored thereon, that when executed, instructs a processor to perform the method of claim 7.

11. The ink printing device according to claim 1, wherein the dryer is an air flow dryer, in which tempered air is blown onto the recording medium from at least one side via air nozzles.

12. The ink printing device according to claim 11, further comprising:
   at least one air supply configured to supply tempered air into the dryer housing via the air nozzles and not via the two openings.

* * * * *